United States Patent
Zhang (12)

(10) Patent No.: US 10,050,544 B2
(45) Date of Patent: Aug. 14, 2018

(54) ULTRA-HIGH POWER ZVS+ZCS INTEGRATED SOFT SWITHING DC/DC CONVERTER

(71) Applicant: Bingyao Zhang, Tianjin (CN)

(72) Inventor: Bingyao Zhang, Tianjin (CN)

( * ) Notice: Subject to any disclaimer, the term of this patent is extended or adjusted under 35 U.S.C. 154(b) by 0 days.

(21) Appl. No.: 15/854,804

(22) Filed: Dec. 27, 2017

(65) Prior Publication Data

US 2018/0191259 A1    Jul. 5, 2018

(30) Foreign Application Priority Data

Jun. 10, 2017 (CN) .......................... 2017 1 0435216

(51) Int. Cl.
    *H02M 3/335*    (2006.01)
    *H02M 3/158*    (2006.01)
    *H02M 1/00*    (2006.01)

(52) U.S. Cl.
    CPC ..... *H02M 3/33592* (2013.01); *H02M 3/1584* (2013.01); *H02M 3/33507* (2013.01); *H02M 2001/0058* (2013.01); *H02M 2003/1586* (2013.01)

(58) Field of Classification Search
    CPC . H02M 2001/0048; H02M 2001/0054; H02M 2001/0058; H02M 2001/0064; H02M 3/335; H02M 3/33507; H02M 3/33523; H02M 3/33538; H02M 3/33546; H02M 3/33553; H02M 3/33569; H02M 2007/4815
    See application file for complete search history.

(56) References Cited

U.S. PATENT DOCUMENTS

| 5,946,200 | A | 8/1999 | Kim | |
|---|---|---|---|---|
| 6,304,460 | B1 * | 10/2001 | Cuk | H02M 1/34 363/131 |
| 6,388,896 | B1 * | 5/2002 | Cuk | H02M 3/1582 363/16 |
| 7,136,293 | B2 * | 11/2006 | Petkov | H01F 27/38 363/126 |
| 2016/0190933 | A1 * | 6/2016 | Lee | H02M 3/33507 363/17 |

\* cited by examiner

*Primary Examiner* — Gary L Laxton (57) ABSTRACT

A ultra-high power ZVS+ZCS integrated soft switching DC/DC converter is disclosed, which adopts a phase shifted full bridge ZVS (zero voltage switching) DC/DC converter circuit. A saturation inductance $L_k = L_{k1} + L_{k2}$ controlled by a load current is series connected to a primary side of a high permeability ring transformer. A RCD buffer circuit for ZCS (zero voltage switching) current zero-crossing switching off is connected to a secondary side of the transformer. When a lead arm commutates, a refringence of a load current is blocked; the ZVS (zero voltage switching) is ensured; exciting current disappears; a lag arm realizes ZCS zero current commutating. The controlled inductance $L_K$ assists to establish a corresponding load refringenced current and the exiting current and recovers electromagnetic induction; The RCD buffer circuit softens the reverse current of bridge rectifier and oscillations caused by the leakage inductance on secondary side of the transformer and the buffer capacitor are attenuated.

7 Claims, 8 Drawing Sheets

Fig.4-1 $t_0 \sim t_1$

Fig.4-2 $t_1 \sim t_1 + \Delta t_{cd}$

Fig.4-3 $t_2$

Fig.4-4 $t_2 \sim t_3$

Fig.4-5 $t_3 \sim t_4$

Fig.8-1 $t_0 \sim t_1$

Fig.8-2 $t_1 \sim t_1 + \Delta t_{cd} \sim t_2$

Fig.8-3 $t_2 \sim t_3$

Fig.8-4 $t_3 \sim t_4 \sim t_5$

Fig.8-5 $t_1$

Fig.8-6 $t_1 + \Delta t_{cd} \sim t_2$

Fig.8-7 $t_2 \sim t_3$

Fig.8-8 $t_3 \sim t_4$

Fig.8

ULTRA-HIGH POWER ZVS+ZCS INTEGRATED SOFT SWITHING DC/DC CONVERTER

CROSS REFERENCE OF RELATED APPLICATION

This application claims priority under 35 U.S.C. 119(a-d) to CN 201710435216.4, filed Jun. 10, 2017.

BACKGROUND OF THE PRESENT INVENTION

Field of Invention

The present invention relates to an ultra-high power ZVS+ZCS integrated soft switching DC/DC converter, and more particularly to an EV (electric vehicle) field. With the development EV industry, charger module no less than 30 KW with high efficiency, high reliability and ultra-high capacity is required for producing a conduction type DC fast charging pile. High power fast power electronic switch component IGBT (insulated gate bipolar transistor) and new high permeability material keep developing and the integrated controller and single chip microcomputer for DC/DC converter are fully developed, which are well prepared for developing the ultra-high capacity charger module. While adopting the new components and new material to produce new ultra-high capacity PWM phase shifted full bridge DC/DC converter for the charger module, a new technology of ZVS+ZCS integrated soft switch is developed. 30 KW charger module, 40 KW & 50 KW single-module mobile DC fast charging pile and multi-module ultra-high capacity electric bus DC fast charging pile are produced. The technology has far-reaching influence on the energy saving economy.

Description of Related Arts

Figure 1:
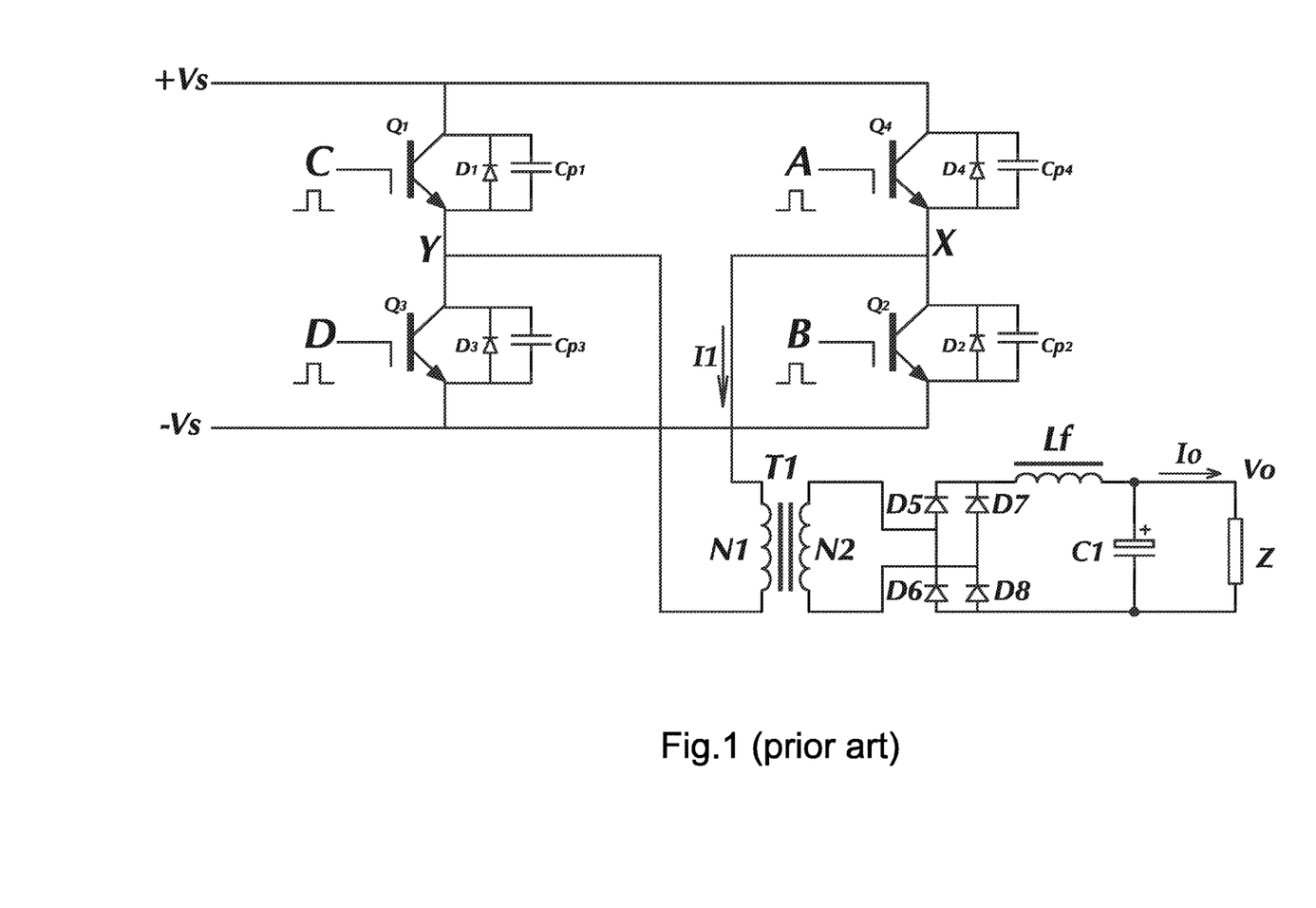
FIG. 1 is a schematic diagram of a conventional phase shifted full bridge ZVS (zero voltage switching) DC/DC converter.
Figure 2:
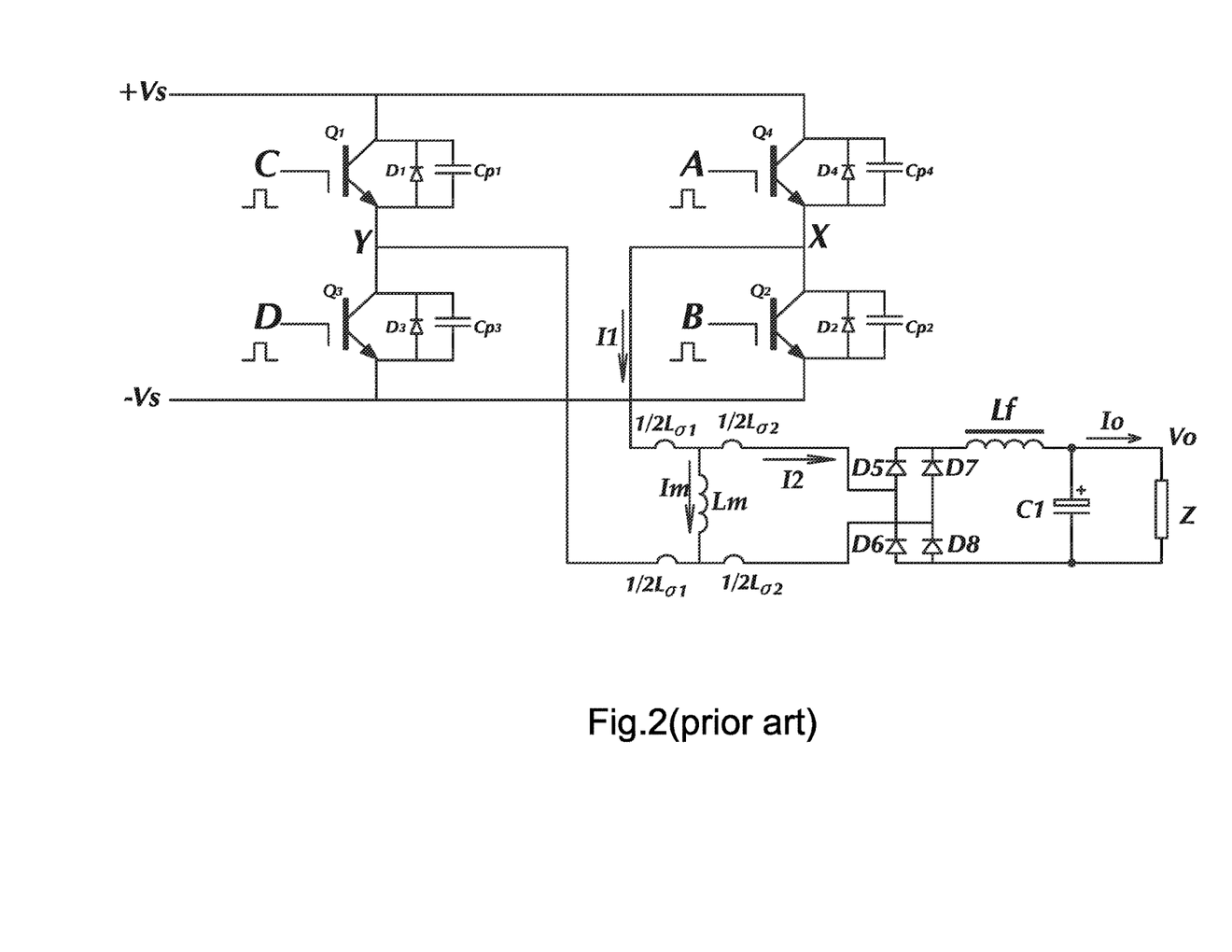
FIG. 2 is an equivalent schema circuit of the conventional phase shifted full bridge ZVS DC/DC (zero voltage switching) converter.
Figure 3:
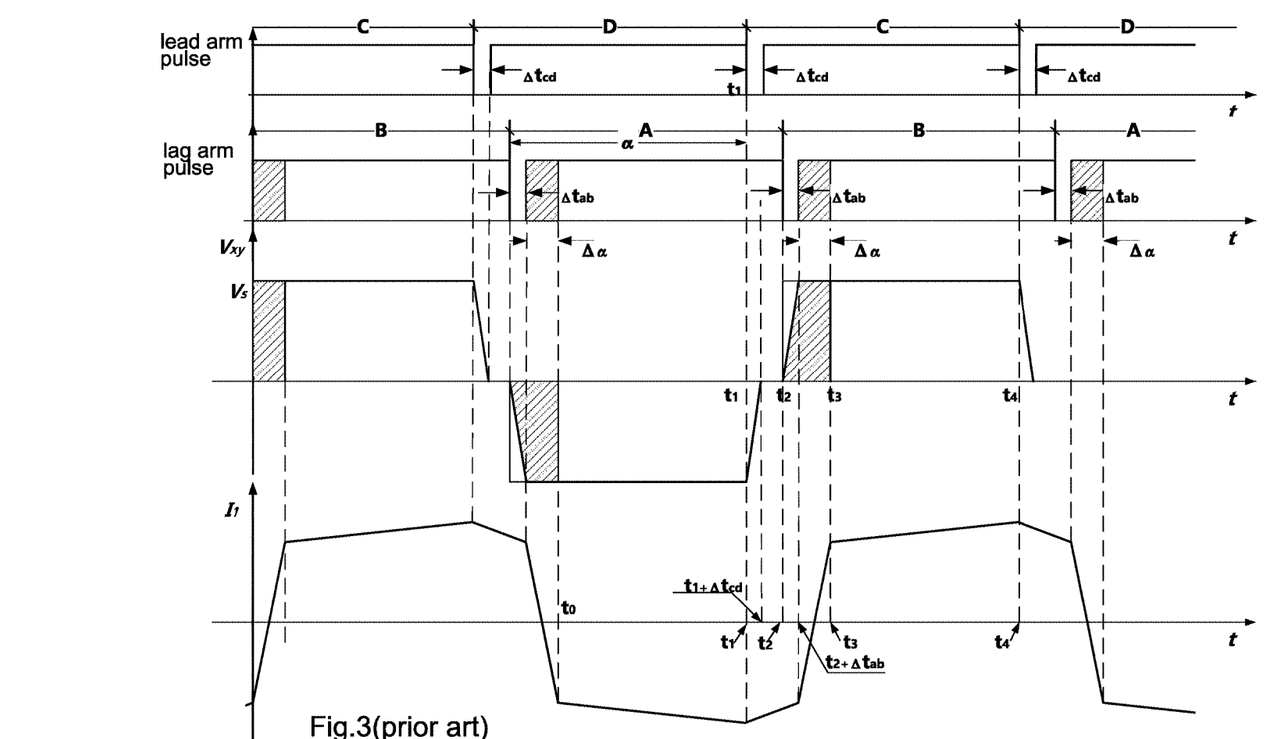
FIG. 3 is a sequence diagram of the conventional phase shifted full bridge ZVS DC/DC (zero voltage switching) converter, which comprises four IGBT trigger pulses A, B, C, D; node voltage $V_{xy}=f(t)$ of two bridge arms; primary side current $I_1=f(t)$ of a transformer; and load current $I_0=f(t)$.
Figures 4, 45:
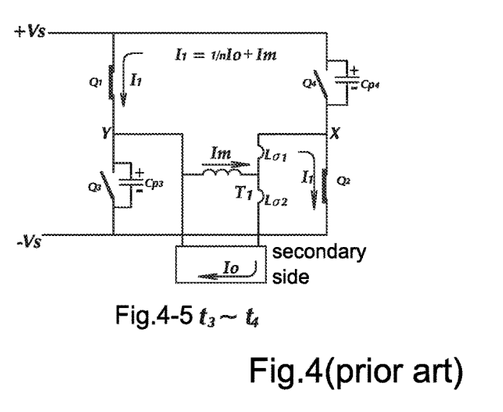
Figure 41:
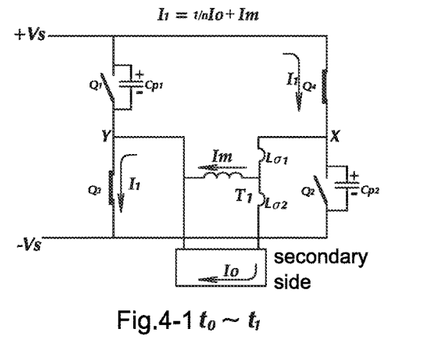
Figure 42:
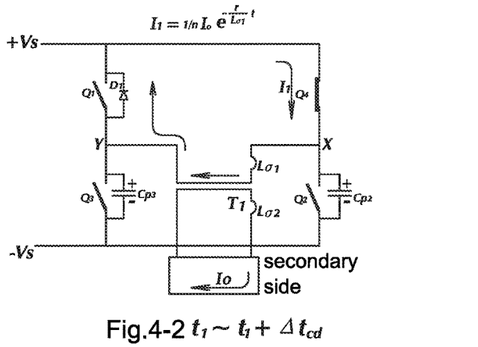

The conventional phase shifted full bridge ZVS (zero voltage switching) DC/DC converter is shown as FIG. 1, which has two bridge arms. Each of the bridge arms adopts an IGBT module on which are two controlled switch tubes. The two bridge arms are parallel connected before connected to a three phase rectifier $V_s$. $Q_1$ and $Q_3$ are on the lead arm; $Q_4$ and $Q_2$ are on the lag arm; $Q_1$, $Q_2$, $Q_3$ and $Q_4$ are four high capacity IGBT. Each IGBT comprises a collector, an emitter and a gate to constitute a voltage controlled switch. A built-in reverse diode $D_i$ and a commutating capacitor $C_{pi}$ (a sum of the built-in capacitor and the parallel connected capacitor, i=1, 2, 3, 4) are parallel connected to two ends of the switch. A transformer $T_1$ is cross connected in the middle of the two bridge arms. The transformer establishes an electromagnetic induction relation of "voltage ratio between the primary coil $N_1$ and the secondary coil $N_2$ is proportional to the turns; current ratio between the primary coil $N_1$ and the secondary coil $N_2$ is inverse proportional to the turns $n=V_1/V_2=N_1/N_2$, $1/n=I_1/I_2=N_2/N_1$" by absorbing the exciting current $I_m$ to generate the main flux; wherein the energy is transferred. The induction corresponding to the main flux is an exciting induction $L_m$ of the transformer. The magnetic flux generated by two coil currents $I_1$ and $I_2$, which passes through the coil $N_1$ alone and coil $N_2$ alone, is leakage flux. The corresponding inductance is leakage inductance $L_{o1}$ and $L_{o2}$. The variable-ratio of the transformer $n=N_1/N_2=1$ and an equivalent circuit is obtained for the convenience of analysis. The equivalent schema circuit of the phase shifted full bridge ZVS DC/DC converter is redrawn as FIG. 2. The gate of the two switch tube $Q_1$ and $Q_3$ on the lead arm and the two switch tube $Q_4$ and $Q_2$ on the lag arm are phase shifted trigger controlled by two pairs of pulses C, D and A, B with a phase difference of 180° and a phase angle of 180° respectively. In order to prevent a direct short-circuit fault while the two switch tubes on the same arm commutating, an adjustable dead time $\Delta t_{cd}$ and $\Delta t_{ab}$ are reserved during initial pulses. Once the circuit is started up, four pulses appears at the same time; wherein A and C are of the same phase; B and D are of the same phase; the transformer $T_1$ withstands a zero voltage. The phase of the lag arm pulses A and B are fixed; the phase of the lead arm pulses C and D are gradually moves backwards with the extending soft start time (the reason for why C, D are lead arm); the work phase angle α of the transformer $T_1$ while withstanding a voltage is gradually increasing; a +-alternating is induced on the secondary side; the energy feed to the secondary side by the gradually extending square wave voltage is increasing. The process is illustrated in FIG. 3. Referring to the topology of the multiple time division equivalent circuit illustrated in the FIG. 4, the working theory is described as below:

$t_0 \sim t_1$ is the energy transfer period. As illustrated in FIG. 3 and FIG. 4-1, an exciting current $I_m$ flows through the transformer and an electromagnetic induction relation is established. D pulse moves backwards by a phase angle α relative to A pulse; $Q_3$ and $Q_4$ are triggered; the transformer withstands the phase angle of the power voltage; $C_{P1}$ and $C_{P2}$ are charged by the power supple $V_s$; while the coil resistance and the leakage inductance are ignored, $V_{XY}=V_s=V_{ST}=V_m=L_F dI_0/d_t + V_0$, $dI_0/dt=(V_{st}-V_0)/L_F$; the primary side current $I_1=I_0'+I_m=(1/n)I_0+I_m$ ($I_0$: load current; $I_0'=(1/n)I_0$: the load current refringenced to the primary side; $I_m$: the exciting current of the transformer).

$t_1 \sim t_1 + \Delta t_{cd}$ the circuit progresses to a commutating period and the lead arm commutates. As illustrated in FIG. 3, when $t=t_1$, the pulse D closes and $Q_3$ switches off. In the dead time period $\Delta t_{cd}$, the inductance current $I_1=(1/n) I_0+I_m$ does not change suddenly; the commutating capacitor $C_{P3}$ of the $Q_3$ is charged; the voltage $V_Y=1/C_{P3}\int I_1 dt$ rises to conduct the built-in diode $D_1$ of the $Q_1$ and is embedded in $V_Y=V_S$; the dead time $\Delta t_{cd}$ ends; the pulse C triggers the switch tube $Q_1$ to realize ZVS voltage zero-crossing switch on; $V_{XY}=0$; the voltage applied on the primary coil $N_1$ of the transformer $T_1$ fulfills $V_{ST}=V_m+V_{o1}=V_{XY}-V_{o1}=V_{o1}$; the leakage inductance voltage disappears afterwards; the voltage applied on the transformer is zero; the exciting current $I_m=0$; the transformer lose the electromagnetic induction relation; the primary side current $I_1=I_0'=(1/n) I_0$.

$t_1+\Delta t_{cd} \sim t_2$ is the primary side circulating current period. The current $I_1=I_0'=(1/n) I_0$ flows through $D_1$ inside the $Q_1 \rightarrow$ lag arm switch tube $Q_4 \rightarrow$ the primary coil $N_1$ of the transformer $\rightarrow$ the built-in diode $D_1$ of $Q_1 \rightarrow$ forms the circulating current $I_1$. The circuit is equivalent to a $r_1$, $L_{o1}$ short circuit with a current $I_1=(1/n) I_0$ ($r_1$ is the resistance of the primary side coil $N_1$ of the transformer); Based on Kirchhoff's second law, the process forms a homogeneous differential equation $0=r_1 I_1 - L_{o1} dI_1/dt$ which a resolved as below:

$I_1=Ae^{r_1 t/L_{o1}}$, $A=(1/n) I_0$, the circulating current $I_1=(1/n)I_0 e^{-r_1 t/L_{o1}}$ fulfills $I'_0=(1/n)I_0$ is the initial value; $r_1/L_{o1}$ is the attenuation coefficient; the circulating current extends to $t_2$ when the lag arm triggers the pulse A to switch off and the $Q_4$ switches off; As illustrated in FIG. 3, the circulating current extends to $t_2+\Delta t_{ab}$.

The load current $I_0$ of the secondary side of the transformer flows as freewheeling of filter inductance $L_F$;

$V_0=-L_F dI_0/dt$ and the slope $dI_0/dt=-V_0/L_F$. The primary side current of the transformer is attenuated circulating current; the secondary side current of the transformer is the freewheeling of the filter inductance $L_F$; no electromagnetic induction relation between the primary side current and the secondary side current.

Figure 43:
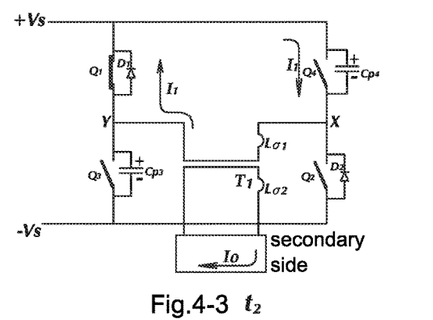

$t_2\sim t_3$ is the lag arm commutate period and the transformer reverse once. $I_1$ wave is illustrated in FIG. 3 and FIG. 4-3; when $t_2$, pulse A closes, $Q_4$ switches off; in the dead time $\Delta t_{ab}$ period of the B pulse, the attenuated current $I_1=(1/n) I_0 e^{-r1t/L_{o1}}$ charges the commutating capacitor $C_{P4}$ of the $Q_4$; the voltage $V_X=1/C_{P4}\int I_1 dt$ decreases until the built-in Diode $D_2$ of the $Q_2$ is conducted and is embedded in $V_x=0$; the dead time ends; the triggering pulse B appears; the switch tube $Q_2$ realizes ZVS; $Q_4 \rightarrow Q_2$ commutation is completed; the transformer reverses once; the commutation is completed by using the energy $(\frac{1}{2}) L_{o1} I_1^2$ of resonant between the leakage inductance $L_{o1}$ and the parallel connected capacitor $C_{P4}$ to the switch component; the energy of leakage inductance $L_{o1}$ is limited and is not able to guarantee a full range of load ZVS. Both insufficient energy and exceeding energy force the switch tube to switch on or induce ringing, which increases switch loss; circuit: $+V_S \rightarrow Q_1 \rightarrow$ leakage inductance $L_{o1} \rightarrow Q_2 \rightarrow -V_S$; Based on Kirchhoff's second law an equation emerges: power voltage $V_S = r_1 I_1 - L_{o1} dI_1/dt$, after commutate the diodes $D_1$ and $D_2$ are conducted first, the original circulating current $I_1$ are continuous; based on the rule of $dI_1/dt = V_S/L_{o1}$, as illustrated in FIG. 3, $I_1$ decreases to zero and then rises in a reverse direction until a load current refringenced is established $I_1 = I_0' = (1/n) I_0$ before the exciting current $I_m$ is absorbed and the electromagnetic induction relation recovers.

Figure 44:
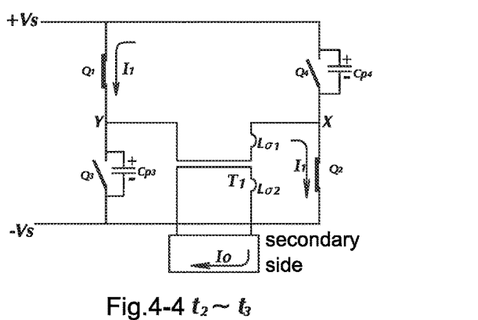

No matter the lag arm is ZVS voltage zero-crossing soft switch on or forced to switch on to commutate, the lag arm is work under the condition of that the exciting current $I_m=0$ and no electromagnetic inductance; in the work zone of the pulse B, the secondary side of the transformer works under no inductance voltage for a period which causes the voltage duty cycle loss on the secondary side. The stronger the load current $I_0'$ is, the stronger the leakage inductance $L_{o1}$ is and the bigger the duty cycle loss is. Referring to $V_{XY}$ and $I_1$ illustrated in FIG. 3, FIG. 4-3 and FIG. 4-4, the duty cycle loss $t_{2-3} = \Delta t_{ab} + \Delta \alpha$.

$t_3\sim t_4$ is the next energy transfer period. The exciting current $I_m$ is absorbed to recover the electromagnetic induction relation. While the coil resistance and the leakage inductance are ignored: $V_{XY} = V_S = V_{ST} = L_F dI_0/dt + V_0$; enters the next energy transfer period, $dI_0/dt = (V_{st} - V_0)/L_F$.

The phase shifted full bridge ZVS DC/DC converter circuit has the below problems:

1. The lead arm commutation brings the circulating current which co-exists with the freewheeling on the secondary side of the transformer and cause extra loss; 2. the commutation of the lag arm is not able to realize ZVS voltage soft switch on within a wide load range, which increases the switch loss; 3. the duty cycle loss $\Delta t_{ab} + \Delta \alpha$ on the secondary side of the transformer is influenced by the leakage inductance $L_{o1}$ and the load and narrows the working range of the input voltage; 4. the high power switch tube switches off with a load and switches on with a voltage, which compromises the electromagnetic compatibility; The existing problems lead to low efficiency and unstable working condition. The capacity of a single module is not able to be further increased over 5 KW.

BRIEF SUMMARY OF THE INVENTION

The present invention modifies the conventional phase shifted full bridge ZVS (zero voltage switching) DC/DC converter to ensure a double soft switching function of voltage zero-crossing switch on and current zero-crossing switch off by ZVS+ZCS when the lead arm commutates and enters a commutation period. The present invention reverses the transformer by PWM switching frequency and the duty cycle to eliminate the circulating current on the primary side and ensures the primary voltage and the current are in phase according to the requirement of the loads. It also ensures DC voltage and DC current on the secondary side from the rectifier satisfies the needs of the load. Therefore, it achieves high efficiency and good electromagnetic compatibility.

A controlled saturation inductance $L_K = L_{K1} + L_{K2}$ controlled by the load current $I_0$ is added on the primary side of the transformer and a RCD buffer circuit is added on the secondary side of the transformer. Either disconnecting $Q_3$ at positive half cycle or disconnecting $Q_1$ at negative half cycle will make the resonance of Lk and capacitor $C_{p1}$ and $C_{p3}$, then make the primary and secondary voltages of the transformer proportionally decrease. Meanwhile, the voltage of the buffer capacitor $C_{s1}$ and $C_{s2}$ does not change and the voltage of the rectifier diode is reverse bias to block the refringence of the load current to the primary side $$I_0' = \frac{1}{n} I_0 = 0.$$

Figure 82:
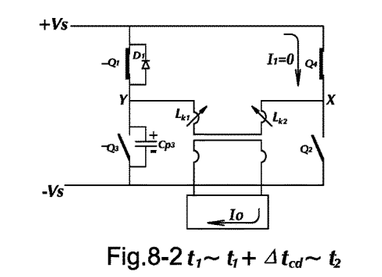

The circulating current is $I_1 = Ae^{-r1t/L_{o1}} + I_m$, $$A = \frac{1}{n} I_0 = 0,$$

so the initial value of the circulating current is $I_m$. When the voltage drops to zero and the exciting current $I_m=0$, the primary side current is absolutely zero $I_1=0$. See FIG. 8-2. The lead arm is ZVS voltage zero-crossing switching on and the primary current will be zero for a period which is enough for the lag arm to be ZCS current zero-crossing switching off and commutation.

The secondary side filter inductance $L_f$ and the filter capacitor $C_1$ enter freewheeling status as soon as the commutation period starts. $I_0$ flows to the load Z through the LC output filter circuit. $I_0$ flows on the secondary side only, the energy of the buffer capacitor $C_{s1}$ and $C_{s2}$ will be absorbed and the voltage will drop down to zero.

The transformer reverses with zero current. The power supply $V_s$ is first applied on the controlled saturation inductance $L_K = L_{K1} + L_{K2}$ controlled by the load current $I_0$, which assist the establishment of the load current refringenced $$I_0' = \frac{1}{n} I_0.$$

The inductance current keeps increasing until the exciting current $I_m$ is established for the transformer and the electromagnetic induction relation recovers. The inducted voltage of the primary voltage $V_{st}$ is applied on the secondary side coil $N_2$ and leakage inductance $L_{o2}$ of the transformer, then the rectifier, and then applied on $C_{s1} R_2$ and $C_{s2} R_1$. The reverse diode of the rectifier is soften by the capacitors $C_{S1}, C_{S2}$ and the attenuating oscillation circuit is established to ensure the seamless connection with the load current $I_0$ of the secondary side in the first oscillation period. The energy continues to transfer to the load through the transformer.

BRIEF DESCRIPTION OF THE DRAWINGS

FIG. 4 is an illustration of topology of five time divisions of the conventional phase shifted full bridge ZVS DC/DC (zero voltage switching) converter;

FIG. 4-1 is an illustration of the energy transfer period $t_0 \sim t_1$ of the conventional phase shifted full bridge ZVS DC/DC (zero voltage switching) converter, when an electromagnetic induction relation is established and the energy is transferred normally;

FIG. 4-2 is an illustration of a commutation of the lead arm of the conventional phase shifted full bridge ZVS DC/DC (zero voltage switching) converter;

FIG. 4-3 is an illustration of lag arm $Q_4$ switching off by using the energy $\frac{1}{2}L_{o1}I_1^2$ of resonant between the leakage inductance $L_{o1}$ and the parallel connected capacitor $C_{P4}$ of the conventional phase shifted full bridge ZVS DC/DC (zero voltage switching) converter;

FIG. 4-4 is an illustration of duty cycle loss caused by the commutation period $t_2 \sim t_3$ of the lag arm according to the circulating current changing slope of the conventional phase shifted full bridge ZVS DC/DC (zero voltage switching) converter;

FIG. 4-5 is an illustration of the next energy transfer period of the conventional phase shifted full bridge ZVS DC/DC (zero voltage switching) converter, when the corresponding load current refringenced established and the transformer absorbs the exciting current Im to recover the electromagnetic induction relation.

FIG. 8 is an illustration of working theory of the ultra-high power ZVS+ZCS integrated soft switching DC/DC converter referring to topologies of four time division on the primary side and four time division on a secondary side;

FIG. 8-1 is an illustration of the energy transfer period to $t_0 \sim t_1$ of the ultra-high power ZVS+ZCS integrated soft switching DC/DC converter, when the electromagnetic induction relation is established and the energy is transferred normally;

FIG. 8-2 is an illustration of a commutation of the lead arm of the ultra-high power ZVS+ZCS integrated soft switching DC/DC converter;

FIG. 8-3 is an illustration of the very short, almost zero, lag arm ZCS zero-current commutate period of the ultra-high power ZVS+ZCS integrated soft switching DC/DC converter;

FIG. 8-4 is an illustration of the transformer absorbing the exciting current $I_m$ to recover the electromagnetic induction relation and recover the energy transfer of the ultra-high power ZVS+ZCS integrated soft switching DC/DC converter;

FIG. 8-5 is an illustration of the blocked secondary side rectifier and the reverse voltage of the buffer diode $D_{10}$ and $D_{11}$ decreasing of the ultra-high power ZVS+ZCS integrated soft switching DC/DC converter;

FIG. 8-6 is an illustration of a parallel connection and discharging of capacitor $C_{S1}$ and $C_{S2}$ when the diode $D_{10}$ and $D_{11}$ are conducted of the ultra-high power ZVS+ZCS integrated soft switching DC/DC converter;

FIG. 8-7 is an illustration of a secondary side freewheeling current $I_0$ of the ultra-high power ZVS+ZCS integrated soft switching DC/DC converter;

FIG. 8-8 is an illustration of the equivalent circuit of the DC voltage $V_{ST}$ connecting to two attenuating oscillation circuits $L_{o2}$, $C_{S1}$, $R_2$; $L_{o2}$, $C_{S2}$, $R_1$, to release the deposited energy of leakage inductance $L_{o2}$ of the ultra-high power ZVS+ZCS integrated soft switching DC/DC converter.

DETAILED DESCRIPTION OF THE INVENTION

An object of the present invention is to provide the below solution to solve the existing problems of the phase shifted full bridge ZVS DC/DC converter circuit:

1 A nanocrystal high permeability ring magnetic core is adopted to produce the transformer $T_1$; the secondary side coil $N_2$ is winded on the inner side to reduce the leakage inductance $L_{o2}$; compared to the ferrite material, the magnetic flux density of the transformer designed is improved by 2.5 a times 2 A pair of EE type ferrite magnetic cores are added; work coil $W_{O1}$, $W_{O2}$ are winded inside of the two coil frame respectively, which are connected tail to tail on the primary side of the transformer; current $I_1$ flows through; And control coil $W_{C1}$, $W_{C2}$ are winded on the outside; a load current $I_0$ flows through head in and tail out; A pair of controlled saturation inductance $L_K=L_{K1}+L_{K2}$ controlled by the load current $I_0$ are obtained; the primary side $N_1$ of the transformer $T_1$ is set between the work coil $W_{O1}$ and $W_{O2}$, as illustrated in FIG. 5

Figure 5:
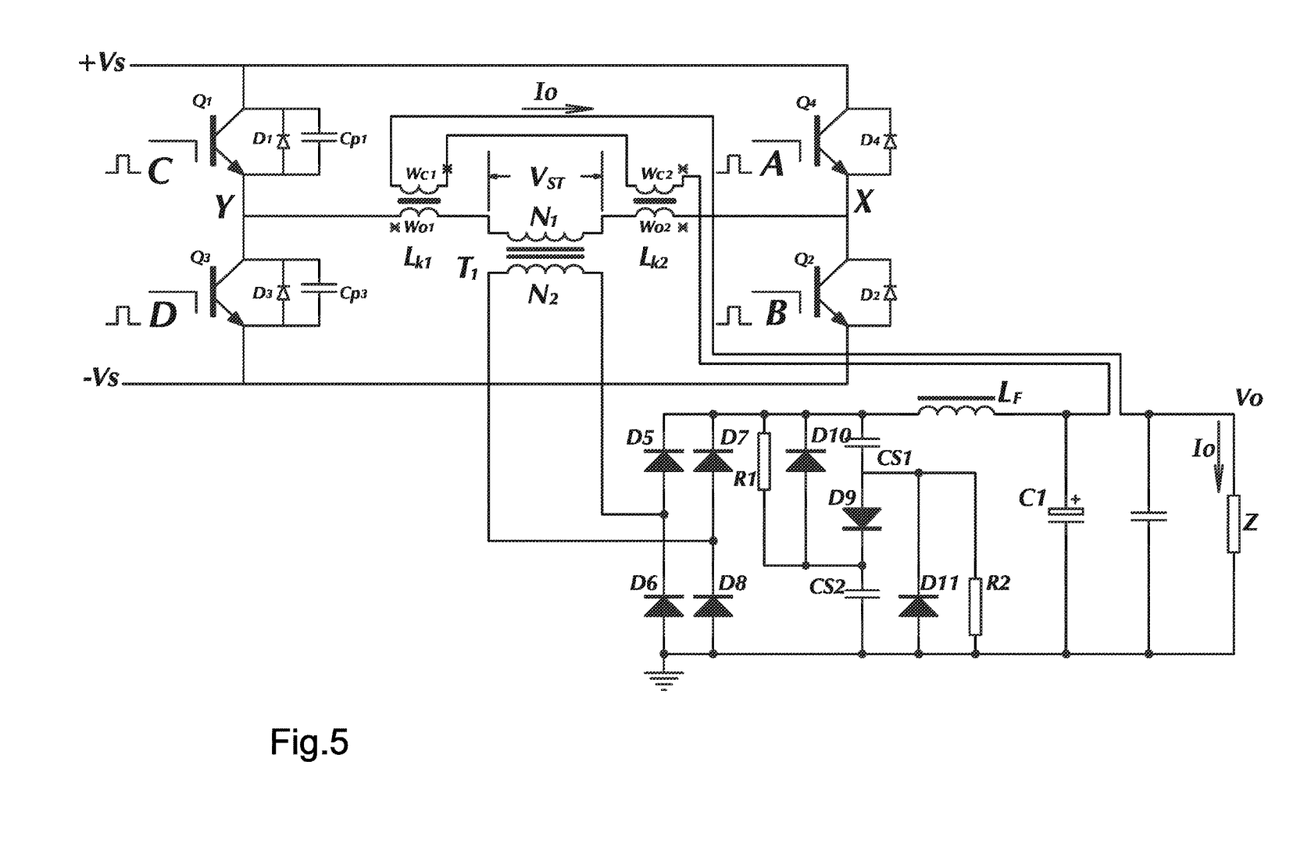
FIG. 5 is a schematic diagram of an ultra-high power ZVS+ZCS integrated soft switching DC/DC converter.

3 One RCD buffer circuit ($C_{s1}$ $C_{s2}$ $R_1$ $R_2$ $D_9$ $D_{10}$ $D_{11}$) in which the two capacitors ($C_{s1}$ $C_{s2}$) are series connected through diode $D_9$ while charging and parallel connected through diodes $D_{10}$,$D_{11}$ while discharging is connected between the rectifier bridge $D_{5\backslash6\backslash7\backslash8}$ on the secondary side of the transformer and the filter inductance $L_F$, and in which there are two resistances $R_1$,$R_2$ parallel connected to $D_{10}$, $D_{11}$ respectively, as illustrated in FIG. 5

Figure 6:
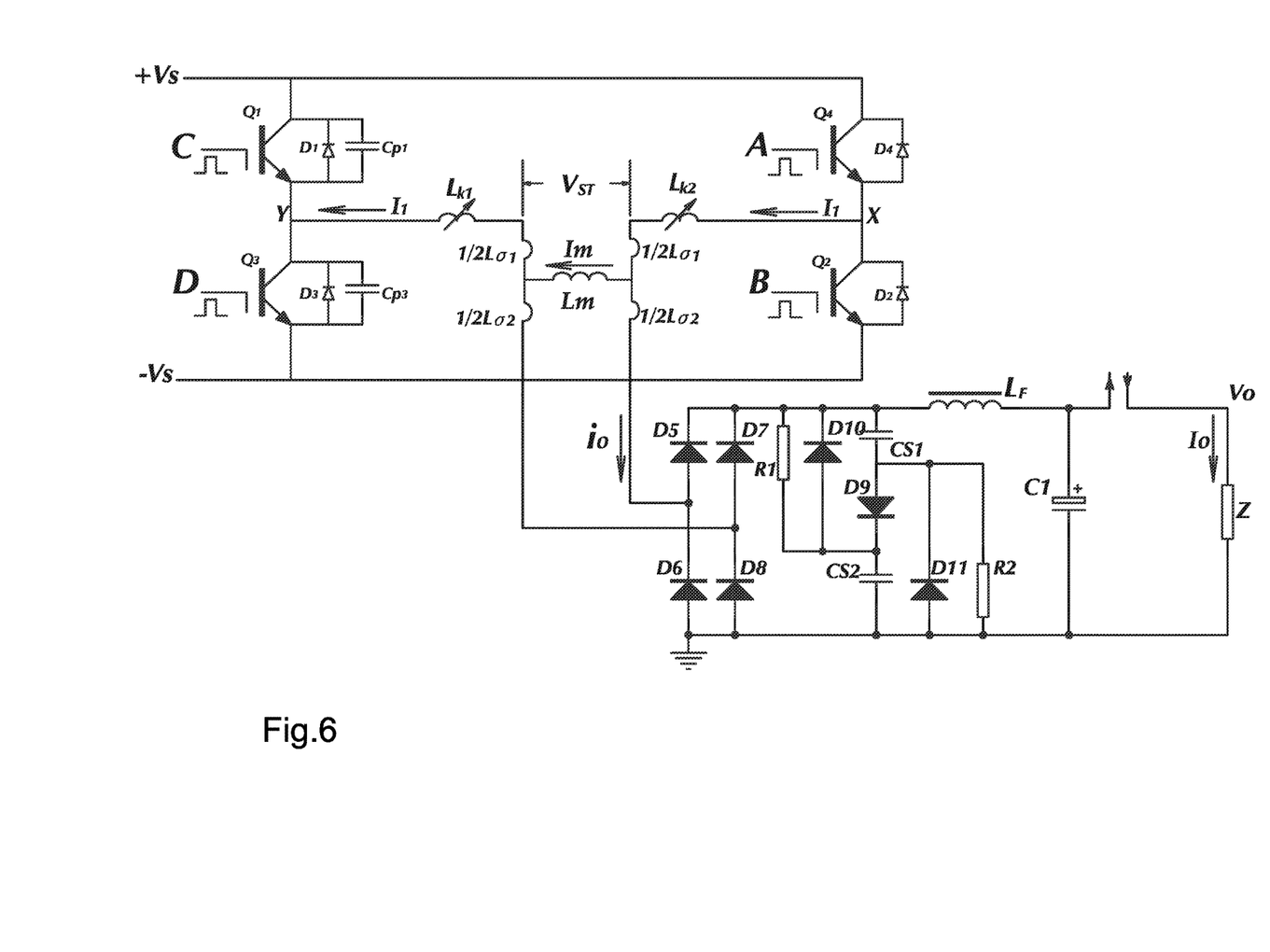
FIG. 6 is an equivalent schema circuit of the ultra-high power ZVS+ZCS integrated soft switching DC/DC converter.
Figure 7:
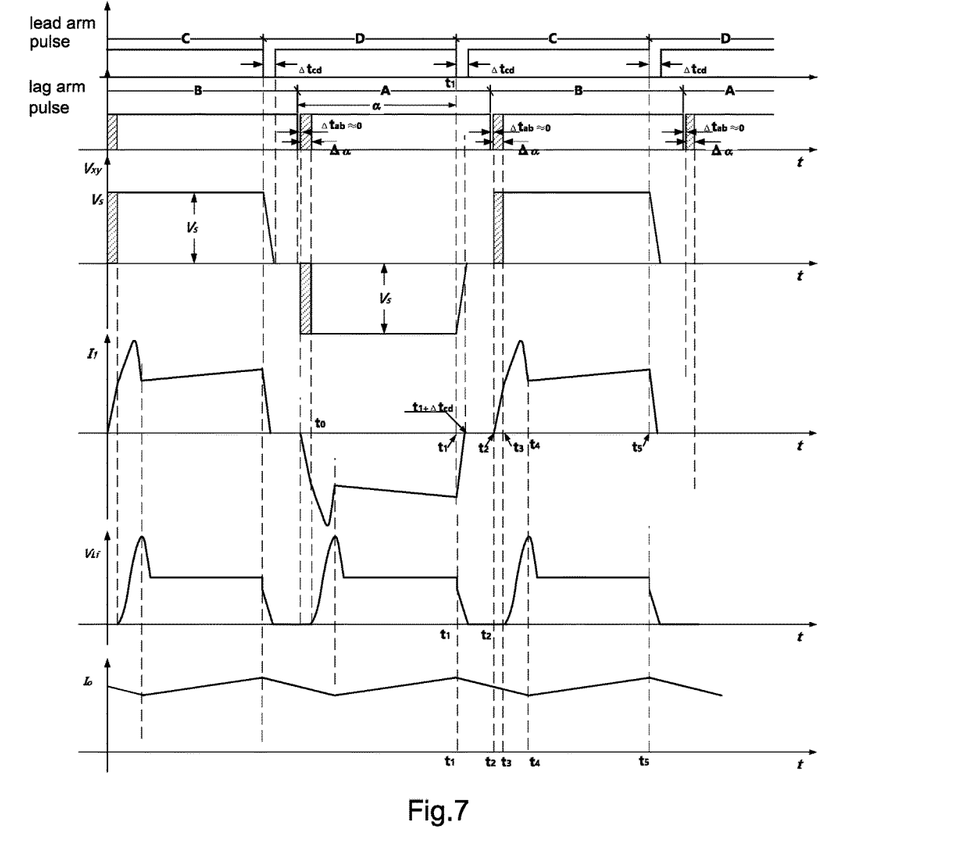
FIG. 7 is a sequence diagram of the ultra-high power ZVS+ZCS integrated soft switching DC/DC converter, which comprises four IGBT trigger pulses A, B, C, D; node voltage $V_{xy}=f(t)$ of two bridge arms; primary side current $I_1=f(t)$ of a transformer; and load current $I_0=f(t)$.
Figure 81:
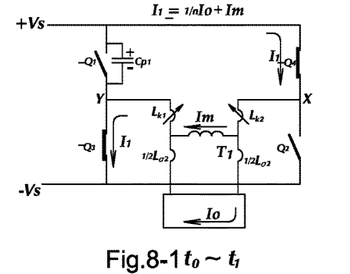

4 Two switch tubes $Q_4$ and $Q_2$ on the lag arm works under the current zero-crossing switch off status; the commutating capacitor $C_{P4}$ and $C_{P2}$ connected outside is cancelled and the initial dead time $\Delta t_{ab}$ of the trigger pulse A and B is approaching zero. The high power phase shifted full bridge ZVS+ZCS integrated soft switch DC/DC converter is illustrated as FIG. 5. The schematic is replaced by a transformer equivalent circuit to obtain an equivalent circuit as illustrated in FIG. 6. The waves of important detection points in the circuit are illustrated in FIG. 7. Referring to the multiple time division equivalent topologies illustrated in FIG. 8, the working theory are described as below:

$t_0$~$t_1$ the energy transfer period; as illustrated in FIG. 7 and FIG. 8-1, the exciting current $I_m$ flows through the transformer and the electromagnetic induction relation is established; $Q_3$ and $Q_4$ are conducted; power $V_s$ charges the $C_{P1}$ and $C_{P2}$ (only built-in capacitor remains); the coil leakage resistance $r_1$, $L_{o1}$, $r_2$ and $L_{o2}$ are ignored; a pair of controlled saturation inductance $L_{K1}$ and $L_{K2}$ are on two sides of the exciting inductance $L_m$, wherein $V_{XY}=V_s=V_{LK1}+V_{ST}+V_{LK2}=V_{LK1}+V_m+V_{LK2}=V_{LK}+L_F dI_0/dt+V_0$; the $V_{LK}$ controlled by the load current $I_0$ is approaching zero and ignored; $dI_0/dt=(V_{st}-V_0)/L_F$; the primary side current $I_1=(1/n) I_0+I_m$ ($I_0$: load current; $I'_0=1/nI_0$: the load current refringenced to the primary side. $I_m$: the exciting current of the transformer).

$t_1$~$t_1+\Delta t_{cd}$ is the lead arm commutates and the circuit enters a commutation period. As illustrated in FIG. 7 and FIG. 8-2, when $t=t_1$, the pulse D closes and $Q_3$ switches off; in the dead time $\Delta t_{cd}$ period of the pulse C, a controlled saturation inductance $L_K=L_{K1}+L_{K2}$ is added; energy $\frac{1}{2}L_K I_1^2$ in the $L_K$ causes itself and the capacitance $C_{P3}$ to resonant, the voltage $V_Y$ rises until the built-in diode $D_1$ is conducted the voltage is embedded in $V_Y=V_S$. When $t_1+\Delta t_{cd}$ dead time ends; the trigger pulse C appears; the switch tube $Q_1$ realizes ZVS voltage zero-crossing switch on; the ZVS soft switch of the lead arm remains. The primary voltage $V_{ST}=V_S-(V_{LK1}+V_{LK2})$ of the transformer rapidly decrease. The secondary side voltage changes proportionally with primary voltage because the existence of the electromagnetic induction relation; the self charging voltage of the buffer capacitor $C_{S1}$ and $C_{S2}$ comply with $V_{CS1}+V_{CS2}=V_S/n$; the reverse voltage of the diode $D_{10}$ and $D_{11}$ changes with the secondary side voltage; the capacitor $C_{S1}$ and $C_{S2}$ is parallel connected and discharging; As illustrated in FIG. 8-6, the current is based on $I_0=C_{S1}dV_{ST}/dt$ and follows the rule $dV_{ST}/dt=I_0/C_{S1}$, which becomes the freewheeling of the output filter $L_F$ and discharging to the load as illustrated in FIG. 7. Due to $C_{S1}>C_P$, the refringenced load current $I_0$ to the primary side is blocked while freewheeling as illustrated in FIG. 7 and FIG. 8-7. The work coil $W_{01}$ and $W_{02}$ of $L_{K1}$ and $L_{K2}$ are set beside two sides of the transformer primary side; When the lead arm commutation is completed, $D_1$ is conducted; $V_{ST}$ drops to zero; the transformer exciting current disappears $I_m=0$; the primary side current of the transformer $I_1=(1/n)I_0+I_m=0$; the primary side circuit enters zero-current interval period referring to the current wave $I_1$ illustrated in FIG. 7 and FIG. 8-2.

The load current $I_0$ on the secondary side of the transformer works as the freewheeling current of the filter inductance $L_F$ within the $t_1-t_2$ time period; $V_0=-L_F dI_0/dt$ and the slope is $dI_0/dt=-V_0/L_F$. During the time period, the primary side is in zero-current interval period and the current $I_0$ of the secondary side is the freewheeling current of $L_F$.

Figure 83:
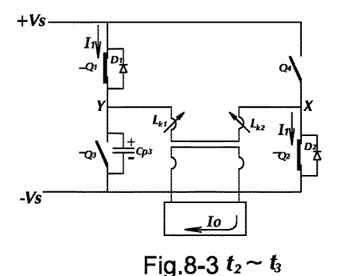

$t_2$~$t_3$ is the lag arm ZCS zero-current commutate period. As illustrated in FIG. 7, the pulse A closes at $t_2$ and pulse B appears almost at the same time ($\Delta t_{cd}=0.4$ us); the transformer completes a reverse of an extremely short delay under the zero-current status. The power voltage $V_S$ is applied on the controlled inductance $L_K=L_{K1}+L_{K2}$ as illustrated in FIG. 8-3. Based on the rule $V_S=L_K dI_1/dt$, $dI_1/dt=-V_S/L_K$ and the change rate of the current $I_1$ is $V_S/L_K$. The controlled saturation inductance $L_K=f(I_0)$ controlled by the load current $I_0$ is obtained by selecting the ampere-turns ratio (WC110/W01I1) of the control winding and work winding for the controlled saturation inductance $L_K$. As illustrated in chart 1, starting from zero, the slope is controlled by the controlled inductance $L_k$, which is the slope is controlled by the load current $I_0$. The corresponding load current refringenced is $I_1=I_0'=(1/n)I_0$ as illustrated in FIG. 7 current wave $I_1$, $t_2-t_3$ section. The circuit is illustrated in FIG. 8-3.

Chart 1. the controlled saturation inductance $L_k=f(I_0)$ controlled by the load current $I_0$

| $I_0$(A)   | 0  | 21.5 | 39   | 51  | 66.9 | 76  |
|------------|----|------|------|-----|------|-----|
| $L_k$ (uh) | 30 | 22.8 | 11.7 | 4.0 | 2.7  | 2.0 |

Figure 84:
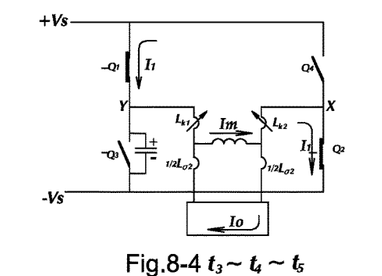
Figure 85:
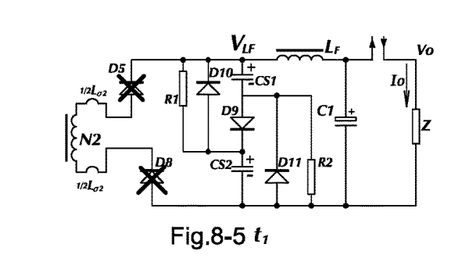
Figure 86:
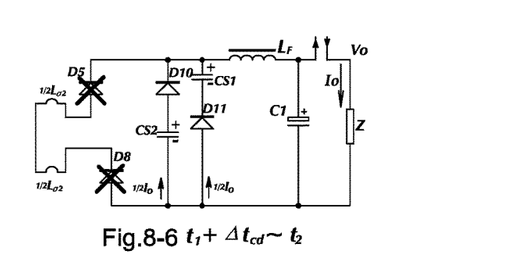
Figure 87:
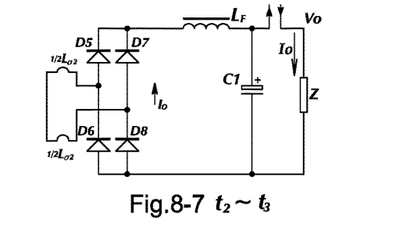
Figure 88:
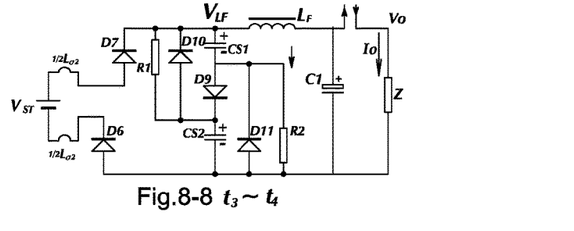

$t_3$~$t_4$ the transformer absorbs the exciting current $I_m$ to recover the electromagnetic induction relation between the primary side and the secondary side of the transformer. The corresponding load current refringenced established by the controlled saturation inductance $L_K$ enters the secondary side and charges the series connected buffer capacitors $C_{S1}$ and $C_{S2}$. The voltage $V_{ST}$ on the secondary side is applied on the oscillating circuit of the leakage inductance $L_{o2}$ and the series connected buffer capacitor $C_{S1}$ and $C_{S2}$. In order to eliminate the oscillation, buffer resistance $R_1$ and $R_2$ are parallel connected besides the reverse diode $D_{10}$ and $D_{11}$ to absorb the deposited energy of the leakage inductance $L_{o2}$. The equivalent circuit is illustrated in FIG. 8-4 and FIG. 8-8, which is equivalent to a circuit where the DC voltage $V_{ST}$ is connected to two attenuating oscillation circuits $L_{o2}$, $C_{S1}$, $R_2$, $L_{o2}$, $C_{S2}$, $R_1$. The secondary side coil $N_2$ of the transformer is required to set inside to reduce the leakage inductance $L_{o2}$ and the deposited energy, which reduces the energy consumption of the resistance $R_1$ and $R_2$ and ensures a seamless connection between the primary current and the output filter $L_F$ freewheeling current; the circuit enters the energy transfer period.

$t_4$~$t_5$ enters the next energy transfer period. As illustrated in FIG. 8-4, $V_{XY}=V_S=V_{ST}=V_{LK}+L_F dI_0/dt+V_0$. $V_{LK}$ is approaching zero when the load is rather big and $dI_0/dt=(V_{st}-V_0)/L_F$; A current charges the buffer capacitor $C_{S1}$ and $C_{S2}$ through the resistant $R_2$ and $R_1$. As illustrated in FIG. 7, the current wave $I_1$ is a sine wave before becomes a flat wave shown by a dotted line the slope of which is approaching zero.

A smart charger KCG-120 A/E264V-3G is successfully developed by adopting the present invention of high power phase shifted full bridge ZVS+ZCS integrate soft switch DC/DC converter, which is use as the power supply charger for beacon light on an island. The working frequency is 25 KHZ; the output power is 31.8 KW; the rated voltage and current are 264V and 120 A respectively; the input voltage is 3Φ380 VAC.

The BYC-30X series charging pile produced by the Tianjin Beiyang electric Co., Ltd. adopts the present invention, which are 30 KW charging modules supporting the ultra-high capacity DC fast charging pile for electric vehicle and electric bus. The present invention has a promising future for application on single vehicle, single module 40 KW, 50 KW mobile DC fast charging pile.

Datasheet of the load experimental efficiency of the 30 KW DC/DC converter module

| $V_{out}$(VCD) volts | 387 | 380.5 | 382  | 380.5 | 380  | 381  |
|----------------------|-----|-------|------|-------|------|------|
| $I_{out}$(ADC) ampere | 5.4 | 66.2  | 68.7 | 71    | 71.3 | 77.9 |
| $V_{in}$(VDC)volts   | 576 | 530   | 542  | 539   | 545  | 538  |
| $I_{in}$ (ADC) ampere | 5.2 | 49.8  | 51.6 | 53.4  | 53.6 | 58.6 |

| | | | | | | |
|---|---|---|---|---|---|---|
| η = $(V_{out}*I_{out})/(V_{in}*I_{in})$ (%) efficiency | 70% | 95.5% | 93.8% | 93.7% | 92.7% | 94.3% |

The above chart is the efficiency datasheet tested by 30 KW DC/DC converter module load experiment. The highest efficiency is 95.5%; the temperature rise of the lead arm IGBT switch tube is 35° C. under air cooling.

What is claimed is:

1. An ultra-high power ZVS+ZCS integrated soft switching DC/DC converter, comprising a phase-shifted full bridge ZVS (zero voltage switching) DC/DC converter wherein two series controlled tubes ($Q_1$, $Q_3$) on a lead arm and two series controlled tubes ($Q_4$, $Q_2$) on a lag arm are parallel connected and then $Q_1,Q_3$ and $Q_4,Q_2$ are connected to an DC power; wherein each of the switch tubes comprises a controlled switch, a built-in diode and a built-in capacitor reverse cross-connected on two ends of the controlled switch, wherein a controlled saturation inductance ($L_k$) controlled by a load current and a high permeability material ring transformer ($T_1$) are series connected in two middles of the controlled switch tubes on the lead arm and the lag arm; wherein a RCD (residual-current device) buffer circuit ($C_{s1}$ $C_{s2}$ $R_1$ $R_2$ $D_9$ $D_{10}$ $D_{11}$) for ZCS (zero current switch) current zero-crossing switching off is connected between a bridge rectifier circuit ($D_5$ $D_6$ $D_7$ $D_8$) and an output filter inductance ($L_f$).

2. The DC/DC converter, as recited in claim 1, wherein the controlled saturation inductance ($L_k$) adopts high permeability material as a magnetic core; the controlled saturation inductance ($L_k$) is divided into a first saturation inductance ($L_{k1}$) and a second saturation inductance ($L_{k2}$) under a control of an output load current ($I_0$); the first saturation inductance ($L_{k1}$) and the second saturation inductance ($L_{k2}$) constitute an integrate controlled saturation inductance ($L_k=L_{k1}+L_{k2}$).

3. The DC/DC converter, as recited in claim 2, wherein the controlled saturation inductance ($L_k$) comprises two pairs of high permeability magnetic cores with saturation magnetization curve and an adjustable air gap; two work coils ($W_{O1}=W_{O2}$) set in inner layer and two control coils ($W_{C1}=W_{C2}$) set in outer layer are wound up on two coil frames respectively; wherein the two work coils are reverse series connected head to tail-tail to head, through which a work current ($I_1$) flows; the two control coils are forward series connected head to tail-head to tail, through which a load current ($I_0$) flows; or the two work coils are forward series connected head to tail-head to tail, through which a primary current ($I_1$) flows; the two control coils are reverse series connected head to tail-tail to head, through which the load current ($I_0$) flows; the control coil and the work coil are set according to a certain ampere-turns ratio $W_{C1}I_0/W_{O1}I_1=W_{C2}I_0/W_{O2}I_1 \geq 1.5$.

4. The DC/DC converter, as recited in claim 1, wherein the high permeability material ring transformer ($T_1$) comprises a high permeability ring magnetic core; a secondary winding is set near to an inner layer of the high permeability magnetic core.

5. The DC/DC converter, as recited in claim 1, wherein the RCD buffer circuit, first diode ($D_9$) is series connected between the two buffer capacitors ($C_{S1},C_{S2}$) and then they ($C_{S1}$, $D_9$, $C_{S2}$) are cross connected to two output ends of a bridge rectifier circuit ($D_5$ $D_6$ $D_7$ $D_8$); a positive electrode of a second diode ($D_{10}$) is connected to an output end ("−") of the bridge rectifier circuit; a negative electrode of the second diode ($D_{10}$) is connected to a node of a first capacitor ($C_{S1}$) and the first diode ($D_9$); a negative electrode of a third diode ($D_{11}$) is connected to an output end ("+") of the bridge rectifier circuit; a positive electrode of the third diode ($D_{11}$) is connected to a node of a second capacitor ($C_{S2}$) and the first diode ($D_9$); wherein a first resistance ($R_1$) is parallel connected to the second diode ($D_{10}$); a second resistance ($R_2$) is parallel connected to the third diode ($D_{11}$).

6. The DC/DC converter, as recited in claim 1, comprising the RCD buffer circuit wherein the two buffer capacitors ($C_{S1}$, $C_{S2}$) need $C_{S1}=C_{S2}>n^2*C_{pi}$ ($n=N_1/N_2$, i=1,3, $C_{pi}$: a sum of the built-in capacitors of the two controlled switch tubes on the lead arm of primary side of the transformer and two parallel connected commutating resonant capacitors).

7. The DC/DC converter, as recited in claim 1, wherein the two controlled switch tube ($Q_2$ $Q_4$) on the lag arm do not parallel connect a commutating resonant capacitor; a dead time $\Delta t_{AB}$ of trigger pulses A, B of the two controlled switch tubes is approaching zero and is not less 0.4 us.

* * * * *